Aug. 15, 1933.  A. F. BUMPUS  1,922,791
SURVEYING INSTRUMENT
Filed March 5, 1930   3 Sheets-Sheet 1
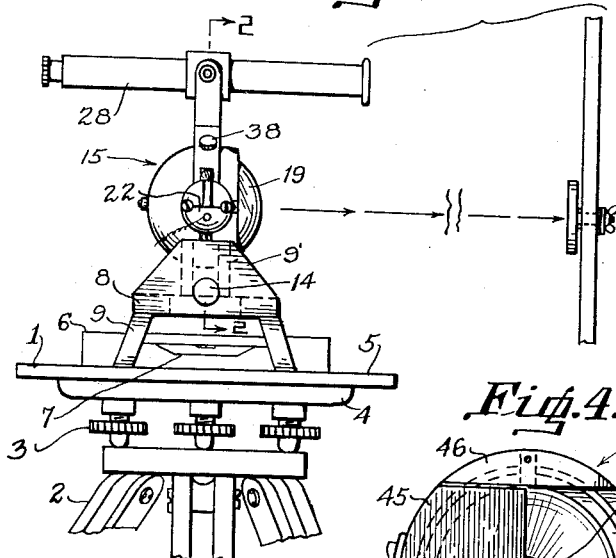
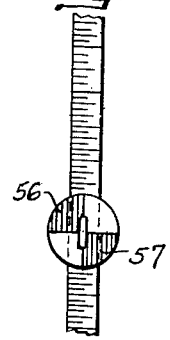
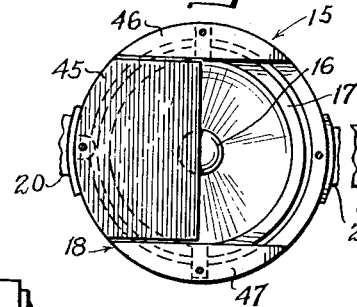
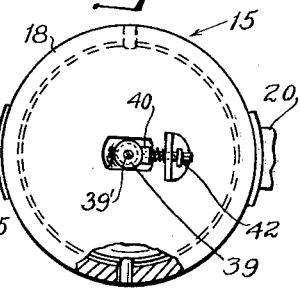
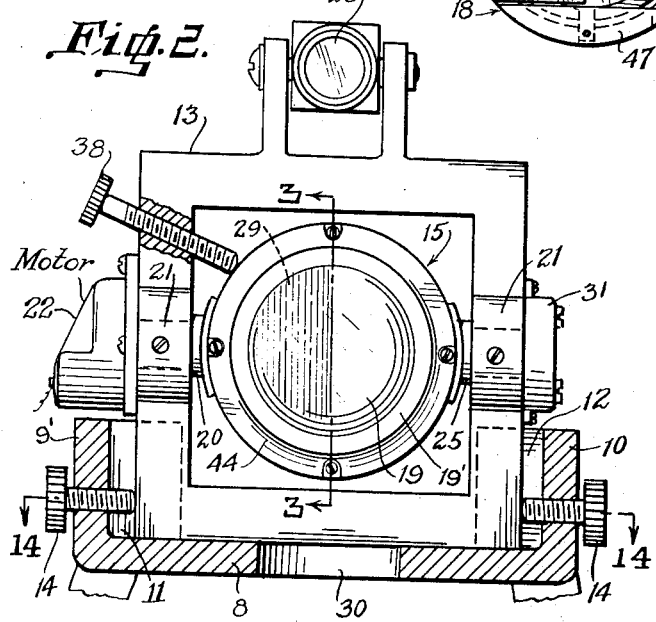
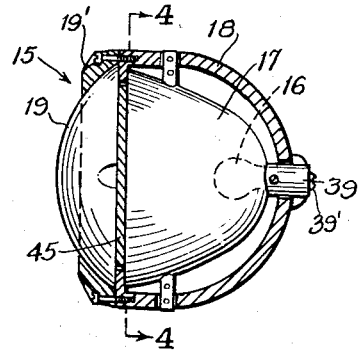
Inventor
Amos F. Bumpus
By Mason Fenwick & Lawrence
Attorneys Aug. 15, 1933.  A. F. BUMPUS  1,922,791
SURVEYING INSTRUMENT
Filed March 5, 1930  3 Sheets-Sheet 2
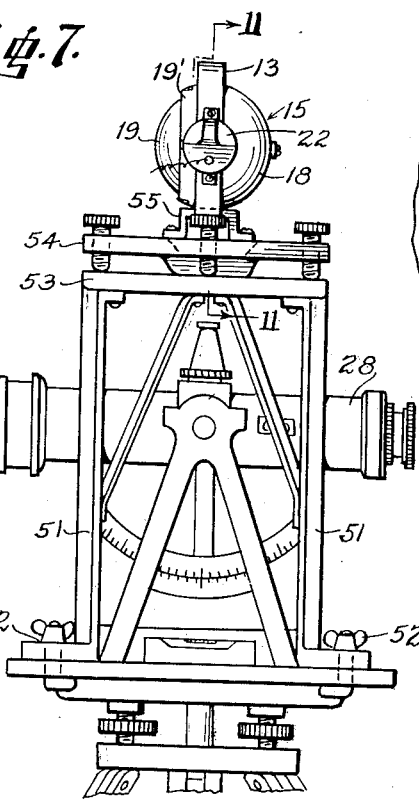
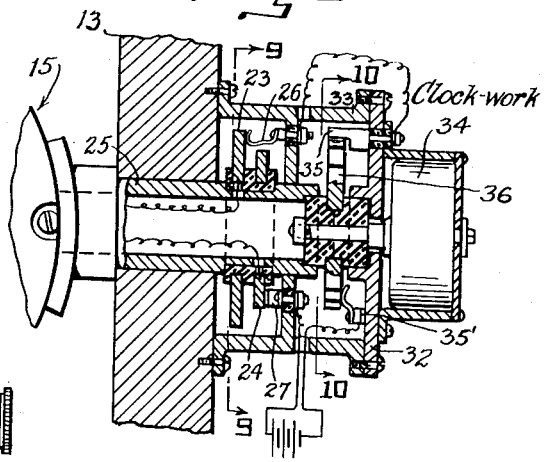
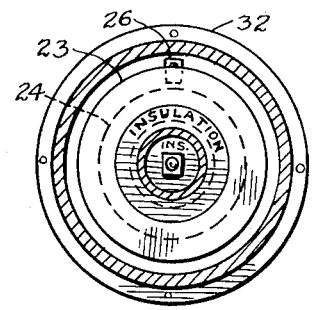
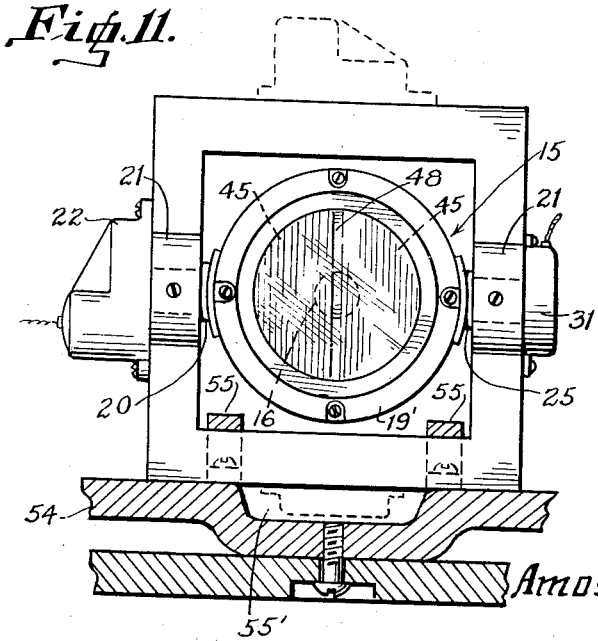
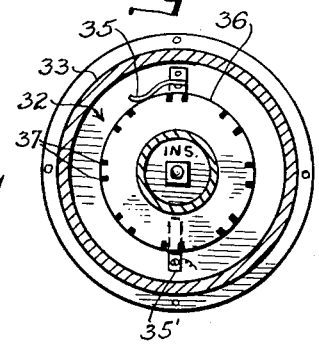
Inventor
Amos F. Bumpus
By Mason Fenwick Lawrence
Attorneys Aug. 15, 1933.  A. F. BUMPUS  1,922,791
SURVEYING INSTRUMENT
Filed March 5, 1930   3 Sheets-Sheet 3

Inventor
Amos F. Bumpus
By Mason Fenwick & Lawrence
Attorneys

Patented Aug. 15, 1933

1,922,791

UNITED STATES PATENT OFFICE 1,922,791

SURVEYING INSTRUMENT

Amos F. Bumpus, Prescott, Ariz.

Application March 5, 1930. Serial No. 433,369

10 Claims. (Cl. 33—46)

This invention relates to surveying instruments, and has for its object the provision of means for utilizing a beam of light from the sun or any suitable source of rays, either visible or invisible, in the running of courses, map making, leveling, etc.

The invention is of special adaptability to work which does not require a precise degree of accuracy, and while it operates with greater efficiency at night, yet with suitable screening at the transit and stadia, it may be successfully employed by day.

In its concrete embodiment, the invention may be exemplified in several forms. It may, for instance, be built into a transit in such a manner as to require reorganization of the normal arrangement of the transit parts, or certain elements thereof may be constructed as an attachment to the ordinary transit.

The invention may also include the combination of the beam creating and directing means, with the target or stadia.

Other objects of the invention will appear as the following description of preferred and practical embodiments thereof proceeds.

In the drawings in which the same characters of reference are used in the several figures to designate identical parts:

Figure 1 is a view in elevation of a transit embodying the present invention, showing also the stadia in operative relation thereto;

Figure 2 is a section on a slightly enlarged scale taken along the line 2—2 of Figure 1;

Figure 3 is a side sectional view through the light source on the line 3—3 of Fig. 2;

Figure 4 is a section taken along the line 4—4 of Figure 3;

Figure 5 is a rear elevation partly in section of the light source;

Figure 6 is a front elevation of a preferred form of the stadia;

Figure 7 is a view in elevation showing a modified form of the invention;

Figure 8 is a sectional view on an enlarged scale showing a modification which could be applied equally well to the apparatus shown in Figures 1 and 7;

Figure 9 is a section taken along the line 9—9 of Figure 8;

Figure 10 is a section taken along the line 10—10 of Figure 8;

Figure 11 is a section taken on an enlarged scale of the upper part of the apparatus shown in Figure 7 showing a modified form of a shutter;

Figure 12:
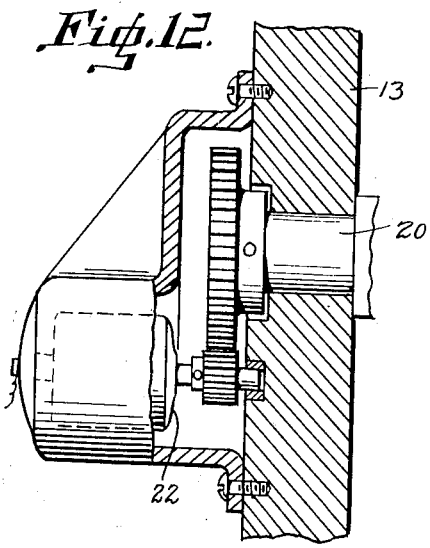
Figure 12 is a side sectional view showing in detail the motor connection common to those forms of the invention shown in Figures 1 and 7.

Referring now in detail to the several figures, and adverting first to that arrangement of the invention shown in Figure 1 and the related figures, the numeral 1 represents in general a transit of known construction comprising the tripod 2, leveling means 3, lower and upper plates 4 and 5, respectively, compass box 6 and level 7.

The additional structure necessitated by the present invention comprises a support 8 suitably secured above the compass box and to the upper plate 5 by means of legs 9 or other up-rights of any desired form and construction.

Figure 14:
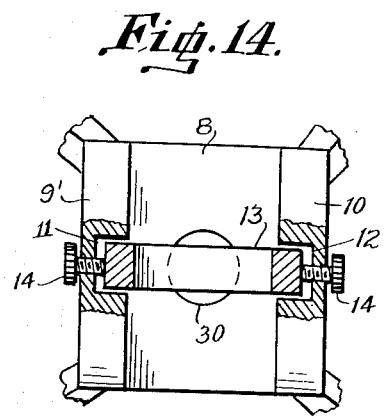
Figure 14 is a section taken along the line 14—14 of Figure 2.

The support 8 (see Figs. 2 and 14) has at its opposite ends the up-standing flanges 9' and 10, the same being formed on their inner sides with guide-ways 11 and 12. These guide-ways afford a seat for the opposite sides of the square frame 13, and said frame is held in place in said guide-ways by means such as the set screws 14.

It is apparent from the construction so far described, that by manipulating the adjusting screws 14, the square frame may be shifted slightly from one side to the other, and that its vertical position may be somewhat heightened or lowered, as may be desired.

The frame 13 carries a source of illumination, which in general is designated by the reference character 15. Said source in the illustrative embodiment of the invention now being described, comprises an incandescent lamp 16, Figure 3, preferably back of the focus of a reflector 17, the light being suitably positioned within a lamp casing 18 to which a convex lens 19 is secured by means such as the clamp ring 19'. Said casing and lens preferably, form an approximately spherical body. The lamp casing, as will be observed from Figure 2, is rotatable within the square frame 13 by means of trunnions 20 and 25 affixed to said lamp casing and carried in oppositely positioned bearings 21 in the sides of the frame 13.

A small electric motor 22 is mounted on one side of the frame 13 and geared to one of the trunnions in such a manner as to rotate the lamp casing very slowly when the motor is operated.

In view of the rotation of the lamp, special means are provided for conducting the lighting current to and from said lamp, said special means comprising insulated slip rings 23 and 24, Figure 8, connected through the hollow trunnion 25 with the lamp terminals, and connected by means of brushes 26 and 27 with the source of electric energy. On top of the square frame 13 the telescope 28 is suitably mounted.

The beam of light is designed to cooperate with a stadia in running or establishing a course, etc., and in order to promote accuracy, the beam should be provided with as flat a side as possible so as to be brought into alignment with a line on the stadia. In order to do this, the lamp casing 18 is screened on one side by a shutter or screen 29 which terminates coincidentally with the diameter of the lens 19. The screen 29 is preferably placed between the lens 19 and the reflector.

The screen 29 and telescope are so related that the flat side of the projected light beam coincides with a plane which embraces one of the hair lines in the telescope. Thus, in running a course, all points of which are in a vertical plane, adjustments are made so that the flat side of the light beam is coincident with the vertical hair line in the telescope. A stadia placed so that the flat edge of the projected beam intersects the center of the target is then in exact line of sight of the telescope. Thus, the beam supplements or takes the place of the telescope and may be used, particularly at night, without employing the telescope in any manner whatever.

In measuring for contours or differences of level, where it is desired that the flat side of the light beam shall extend horizontally, the screen frame 13 may be loosened and turned with the side having the slip rings 23 and 24 at the bottom. The support 8 is formed with an aperture 30 of sufficient size to accommodate the casing 31 which covers the slip ring mechanism.

On account of the refraction of light, it is practically impossible to obtain a sharp edge for the projected beam and, consequently, the target cannot be aligned with mathematical accuracy. However, there are many purposes for which the degree of accuracy of the present apparatus is amply close.

While, theoretically, all the rays emanating from the parabolic reflector 17 are assumed to travel parallel, yet at the remote end of the projected beam, it will be found that the rays are not exactly parallel, but that the beam has a more intensely illuminated central core which the flat side of the beam intersects. A much better line of site for the target may be obtained by slightly oscillating the beam in a vertical direction or horizontal direction, as the case may be, so as to cause the more intensely illuminated part of the flat side to travel up and down through the center of the target. This oscillating movement can be imparted to the beam by oscillating the source of light through suitable gearing, (Fig. 12), between said source of light and the motor 22.

It is also possible to run two or more courses at the same time by having the source of light slowly rotated so that at one period the beam may be directed forwardly of the transit, while at another period, it is directed in the same straight line, but back of the transit. In this manner, courses, both in front of and behind the transit, can be established to run simultaneously. With the frame 13 arranged so that the source of light rotates around a vertical axis, any number of points at the same level may be established at the same time.

Since it is sometimes quite easy to confuse a beam of light from another source with that emanating from the source of light on the transit, it is frequently desirable to identify the beam from the transit, and this is provided for in the present invention by means of a periodic switch 32, a form of which is shown in Figure 10, and which consists of a fixed outer member 33 carrying brushes 35 and 35' and a cooperating rotatable disk 36 operated preferably by clockwork 34. The conductive parts of the disk are broken by means of insulating inserts 37. The part 36 of the switch is intercalated in the circuit which includes the brushes 26 and 27, so that the brush 35 passing over the insulating inserts 37 breaks the circuit intermittently, thus imparting a flashing characteristic to the light beam which distinguishes it from light beams from spurious sources.

Figure 13:
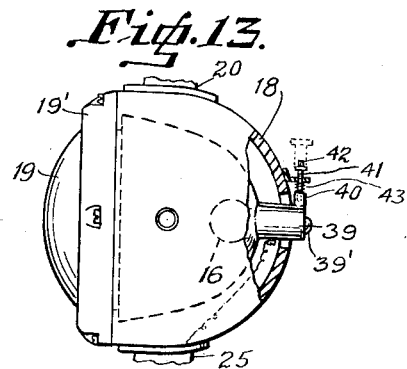
Figure 13 is a top view partly in section of a modified form of the light source.

Means or effecting certain necessary but minor adjustments of the sources of illumination are provided comprising a set screw 38, Figure 2, for fixing the lamp casing 18 in stationary position when desired. There is also the usual focusing means for the lamp 16, the same being shown in detail in Figure 13 comprising a lamp socket slidably mounted in the socket container 39 which is rigidly secured to the reflector 17. Said lamp socket is longitudinally adjustable within said socket container by the screw 39'. In order to permit certain adjustments of the light source from side to side, the socket container and reflector may be slightly swung about the two vertical supports of the reflector by means of a threaded pin 41 having an operating end 42. Said pin projects through a lug, which is rigidly secured to the casing 18, and screws into the lug 40 on the socket container. By turning the pin 41, the lamp may be adjusted from side to side, and the spring 43 provides the necessary tension between the two lugs to keep the lamp in the position desired.

In Figure 2, the shutter 29 is shown as fixed, being suitably held in place by a bezel 44. This is merely one of a number of alternative forms of shutter, another form being shown in Figure 4 in which the shutter comprises a slide 45 having its upper and lower edges held in place by engaging pieces 46 and 47 fixed to the casing 18. There may be a pair of such slides 45, and they may be adjusted to form a narrow slit 48 as indicated in Figure 11. The beam in this instance consists merely of a flat sheaf of rays.

Figures 15, 16:
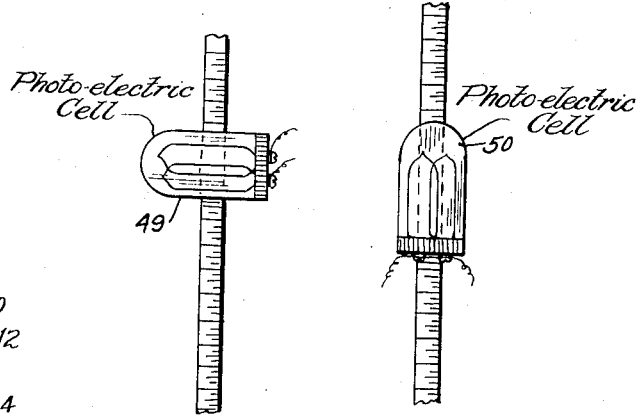
Figures 15 and 16 show in elevation, modified forms of photo-active stadia.

In connection with the nature of the beam of light, it may be stated that considerable advantage is realized in using a photo-active target in place of the target of the usual stadia. Figures 15 and 16 disclose photo-active targets, Figure 15 showing the target 49 arranged for use with a beam of rays the flat side of which is in a horizontal position. Figure 16 shows a target 50 of similar nature arranged for use when the flat side of the beam is vertical. These may be, if desired, the same targets with means for adjustably securing them to the standard in alternative positions. The photo-active target as illustrated consists of light sensitive cells capable of producing electric currents or fluctuations in electric currents. The cells are so positioned that there is a line effect between them, that is to say, when the beam of light strikes one its electrical circuit is energized, and when the beam passes from one to the other, the first circuit is deenergized, while the second circuit is energized. If the cells are placed in line relation to one another, the point at which the deenergization of one takes place, and the energization of the other represents the correct alignment of the target with the flat side of the light beam. The fluctuations in the electric current so created may be indicated by any suitable apparatus which it is thought unnecessary here to illustrate or describe.

It is obvious that instead of artificially creating the light beam, a heliostat may be mounted in the square frame 13, such heliostat being of any well known construction. There is nothing peculiar to the use of such a heliostat which prevents its use as an equivalent for the electric light source illustrated in connection with the present invention.

In Figure 7, a slightly modified form of the invention is illustrated in which the telescope 28 remains undisturbed in its structural relation to the other elements of the transit, a lamp support 51 being provided comprising a plurality of legs suitably clamped to the plates of the transit by means such as the clamps 52. On top of said legs a supporting plate 53 is secured which carries the leveling device 54, the latter being provided with clamping means 55 for securing the square frame 13 and its appurtenant parts in position. The frame in this instance may be shifted to a right angular position, just as in that form of the invention shown in Figure 1, since the supporting plate 54 is provided with a recess 55′ large enough to receive the casing 31 which houses the slip rings. With either of the forms of the invention, it is advantageous in using purely a mechanical stadia to provide the target sectors 56 and 57 with silvered or other reflective surfaces so as to more clearly distinguish the edge of the projected beam.

Figure 17:
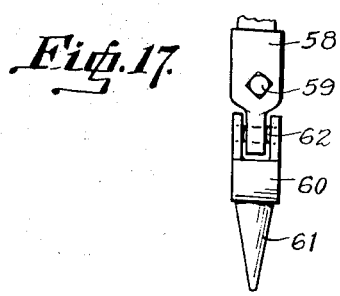
Figures 17 and 18 show end and side elevations of an auxiliary foot for the tripod for the transit.
Figure 18:
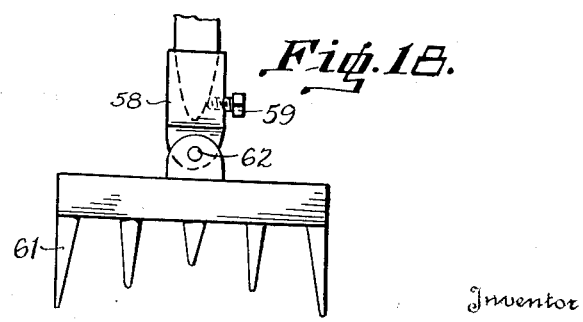

An improvement in the construction of the tripod is illustrated in Figures 17 and 18 comprising attachable foot portions for more securely holding the legs of the tripod in yielding ground. These foot portions, each consists of a two-part device, one part being the socket 58 for receiving the leg of the tripod to which it is firmly attached by means of a set screw 59, the other part comprises a base 60 having a plurality of ground engaging points 61, projecting from its lower surface. The part 60 is preferably pivotally connected to the part 58 as indicated by the reference character 62.

The advantages in such methods of surveying as the present invention makes practicable are several. Such a system eliminates the time and bother necessitated by present methods when the surveyor motions, and wigwags to the rodman in indicating the correct position for the stadia. In the event that two points on the line are established with a clear territory between, and the use of the compass is not necessary; the transit may be set up at one point, and the stadia at the other. Signals from the rodman may assist the surveyor to guide the beam to a coincidence with the course; and with the beam thus properly adjusted, the location of intermediate points may be quickly established. In rocky or bushy country, it is often necessary to make a number of set-ups, or to clear a course in order that there may be unobstructed visibility between the transit and stadia.

By the use of my method, the target or photoelectric cells may be mounted at the top of a long stadia rod; which, in many cases, will enable the rodman to detect the course above the tops of any neighboring trees, rocks, or other obstacles, without clearing a course, and without the necessity of any shouting between men at the transit and stadia. A further possibility for economy in surveying by this method lies in the fact that lines may be run in two or more different directions from the transit at the same time, and without the guidance of a man at the transit.

While I have in the above disclosure, endeavored to describe what I believe to be preferred and practical embodiments of my invention, yet it is to be understood that the invention lies primarily in the broad principles which are common to these several forms and not to the specific details, which may be varied according to the exigencies of use without departing from the spirit of the invention as claimed.

What I claim is:

1. A surveying instrument comprising in combination, orientable means for projecting a beam of rays, means for imparting a flat side to said beam, a transit supported by said orientable means including a telescope having one of its hair lines coincident with the plane of the flat side of said beam said means being adjustable in alternative positions 90° apart.

2. A surveying instrument comprising in combination, orientable means for projecting a beam of rays, means carried by said orientable means for imparting a flat side to said beam of rays, a transit supported by said orientable means including a telescope having one of its hair lines coincident with the plane of the flat side of said beam said projecting means together with said flat side imparting means being displaceable through an angle of 90° for positioning the flat side of the beam in alternative perpendicular positions.

3. A surveying instrument comprising in combination, a frame, said frame being orientable, means for projecting a beam of rays carried by said frame, means for imparting a flat side to said beam, means for supporting said frame relative to said transit into positions 90° apart whereby the flat side of said beam may be alternatively positioned in perpendicular planes and a transit supported by said frame including a telescope having one of its hair lines coincident with the plane of the flat side of said beam.

4. A surveying instrument comprising in combination, a frame, orientable means affording a support for said frame on which the latter is adapted to rest alternatively upon two of its adjacent sides, means for clamping said frame in either of its alternative positions, means for projecting a beam of rays, swivelly mounted in said frame, means carried by said projected means for imparting a flat side to said beam and a transit supported by said frame including a telescope having one of its intersecting hair lines coincident with the plane embracing the flat side of said beam.

5. A surveying instrument comprising in combination, a square frame, an orientable support for said frame on which the latter is adapted to rest alternatively on two of its adjacent flat sides, means for clamping said frame in either of two alternative positions, an electric lamp mounted on trunnions in said frame for projecting a beam of light, means carried by said lamp for imparting a flat side to said beam of light, an electrical motor for revolving said lamp, a conductor forming part of said motor circuit for energizing said lamp, said conductor including slip rings and a transit carried by said frame including a telescope having one of its intersecting hair lines coincident with the plane embracing the flat side of said beam.

6. A surveying instrument comprising in combination, a square frame, an orientable support for said frame on which the latter is adapted to rest alternatively on either of two of its adjacent sides, means for clamping said frame to said support in either of its alternative positions, an electric lamp for projecting a beam of light, trunnions journalled in said frame by which said lamp is swivelly mounted, means for imparting a flat side to said beam of light, a motor carried by said frame for revolving said lamp, one of said trunnions being hollow, a conductor forming part of said motor circuit for energizing said lamp said conductor including slip rings arranged on said hollow trunnion, and brushes co-acting therewith, said conductor passing through said hollow trunnion and a transit carried by said frame including a telescope having one of its intersecting hair lines coincident with the plane embracing the flat side of said beam.

7. A surveying instrument comprising in combination, orientable means for projecting a beam of light from an electrical light source, means carried by said orientable means for imparting a flat side to said beam of light, said projecting means being revolubly mounted, a motor for revolving said light beam, said motor being in circuit with said electrical light source, a periodic switch in said circuit with independent means for actuating the same for interrupting the continuity of said beam of light and a transit supported by said orientable means including a telescope having one of its intersecting hair lines coincident with the flat side of said beam.

8. A surveying instrument comprising means for projecting to a substantial distance a beam of light having a flat side, and means for measuring the angular relationship of the flat side of the beam to a selected plane.

9. A surveying instrument comprising means for projecting to a substantial distance a beam of light having a flat side, means for rotating said beam projecting means on vertical or horizontal axes selectively, and means for measuring the angular relationship of the plane in which the flat side of the beam is rotated with a selected plane.

10. A surveying instrument comprising means for projecting to a substantial distance a beam of light having a flat side and means for turning said beam of light selectively to bring said flat side into vertical or horizontal planes as desired.

AMOS F. BUMPUS.